United States Patent
Kilchenstein et al.

(10) Patent No.: US 8,984,729 B2
(45) Date of Patent: Mar. 24, 2015

(54) SKIS AND METHODS OF MAKING SAME

(75) Inventors: Michael Kilchenstein, Park City, UT (US); Christian Alary, Saint Pierre de Chartreuse (FR)

(73) Assignee: Ramp Sports, LLC, Park City, UT (US)

( * ) Notice: Subject to any disclaimer, the term of this patent is extended or adjusted under 35 U.S.C. 154(b) by 57 days.

(21) Appl. No.: 13/573,256

(22) Filed: Sep. 6, 2012

(65) Prior Publication Data

US 2014/0062064 A1    Mar. 6, 2014

(51) Int. Cl.
| | |
|---|---|
| *B25B 27/14* | (2006.01) |
| *B21D 53/88* | (2006.01) |
| *B32B 3/06* | (2006.01) |
| *B32B 3/10* | (2006.01) |
| *A63C 5/00* | (2006.01) |
| *A63C 5/14* | (2006.01) |

(52) U.S. Cl.
USPC ........... 29/281.1; 29/897.2; 428/99; 428/138; 280/610

(58) Field of Classification Search
USPC ....... 29/281.1; 280/610; 156/60; 428/138, 99
See application file for complete search history.

(56) References Cited

U.S. PATENT DOCUMENTS

| | | | | |
|---|---|---|---|---|
| 3,879,245 | A * | 4/1975 | Fetherston et al. | 156/245 |
| 4,634,140 | A * | 1/1987 | Stroi | 280/610 |
| 4,993,740 | A * | 2/1991 | Recher et al. | 280/610 |
| 5,288,097 | A * | 2/1994 | Pascal et al. | 280/610 |
| 5,427,401 | A * | 6/1995 | Liard | 280/609 |
| 6,059,308 | A * | 5/2000 | Baudin et al. | 280/610 |
| 6,793,862 | B2 * | 9/2004 | Restani | 264/261 |
| 7,258,360 | B2 * | 8/2007 | Vallet et al. | 280/609 |
| 8,104,784 | B2 * | 1/2012 | Sylvain | 280/610 |
| 2007/0296181 | A1 * | 12/2007 | Alary et al. | 280/601 |

* cited by examiner

*Primary Examiner* — Lee D Wilson
*Assistant Examiner* — Alvin Grant
(74) *Attorney, Agent, or Firm* — William E. Mouzavires

(57) ABSTRACT

A ski or snowboard includes a metal layer having integral flanges projecting from its opposite sides to define a cavity for receiving a base layer. Several additional layers of laminated wood and in some versions synthetic polymer or carbon are pressed and bonded together on the metal layer. A method of manufacturing includes a support plate which holds a base layer and edge members received in a slot in the perimeter of the base layer. Additional layers of the ski or snowboard are successively laid on the base layer and pressed and bonded together.

19 Claims, 5 Drawing Sheets

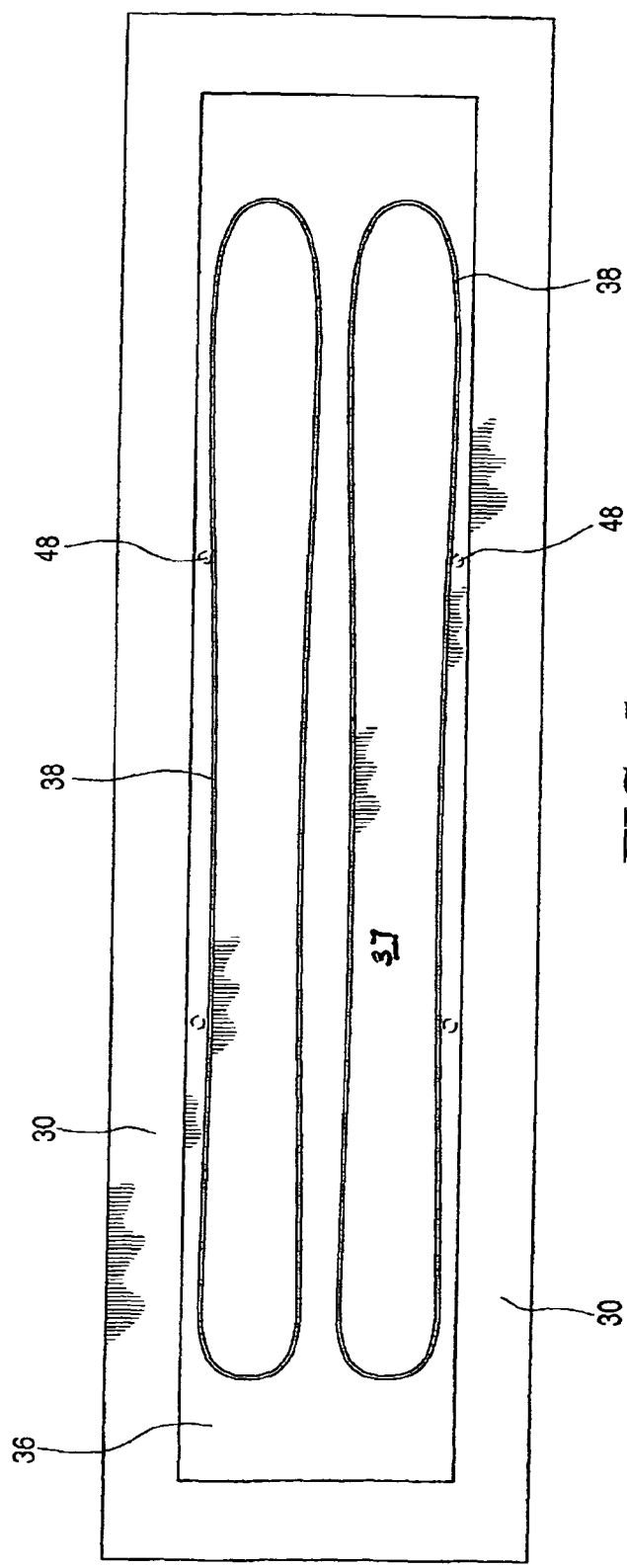
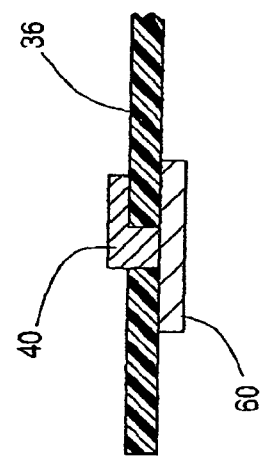
FIG. 5
FIG. 6

SKIS AND METHODS OF MAKING SAME

The present invention generally relates to snow skis and snowboards and methods of making the same. Hereinafter the term "ski" refers to skis or snowboards.

BACKGROUND OF THE PRESENT INVENTION

One present conventional method of making skis and snowboards uses a mold made from relatively thick aluminum plate which is laboriously carved out in accordance with the shape of the ski. A base layer of the ski is placed in the mold and then separate edge members are placed in the mold at the outer perimeter. Epoxy resin is then painted into the mold to wet the base layer and edge members. Layers of fiberglass wet with resin or other layers of zicral aluminum or carbon, are then laid into the mold. A core, pre-cut typically from wood, is then laid on top in the mold and more epoxy resin is repainted in the mold on the core and then two more layers of fiberglass are laid on top of the core. More epoxy is applied and a top layer which may have graphics, is laid on the top. The mold with the assembly of layers therein is then placed in a press under pressure and heat to impart a camber to the assembly and to cure the resins. When the assembly is removed from the mold the product is very rough. The finishing process is very expensive and takes several more steps. First a band saw is used to cut the fiberglass and glue hanging out between the layers. Then up to twenty sanding processes to get the skis or boards to a final finish state may be required. At this point extensive final base finishing is required as the product tends to change shape while curing. It takes several stone grinding and edge finishing passes to get a finish that is usable.

OBJECTS OF THE PRESENT INVENTION

One object of the present invention is to provide novel and improved skis and snowboards as well as methods of making the same.

A further object of the present invention is to provide a novel method of making skis and snowboards that will facilitate the manufacture of different ski shapes and sizes while avoiding the need to create a new mold with the desired shape or size of the ski for each new ski design. Included herein is a novel method and assembly of ski layers and edges that will permit skis of different shapes and sizes to be made without the need of conventional molds or the need to make a new mold for every different model or size of the ski.

A further object of the present invention is to provide skis or snowboards that are easier and less expensive to manufacture than some conventional skis and snowboards and yet will provide a stronger structure and allow improved performance.

A still further object of the present invention is to provide methods of making skis which are an improvement over conventional methods such as that described above from the standpoints of labor, cost, versatility, and efficiency.

SUMMARY OF PREFERRED FORMS OF THE PRESENT INVENTION

A ski or snowboard in accordance with one preferred embodiment of the present invention includes a metallic layer preferably a plate of high carbon steel cut with the desired ski or snowboard shape (in plan view). A recess is formed in one side of the plate in the shape of a base layer which is received in the recess. The recess cut into the plate leaves integral flanges projecting downwardly around the edge portions of the plate to serve as the edges of the ski. A base layer is cut preferably from a sintered polyethylene plastic such as P-Tex 7500 and fits snugly within the flanges where it is bonded to the plate. The plate with the base layer is laid on a generally flat support surface and then successive core layers and a top layer are applied with resin to the metal plate on the side opposite the base layer. The assembly is then drawn or pressed together and heated to cure the resin.

In another preferred form of the present invention, the core and top layers are pre-cut to the desired ski shape and assembled one on top of the other on a base layer with resin in between the layers. A sheet of material from which the base layer is made is supported on a generally flat support plate and has a slot or other opening cut about its perimeter defining the shape of the ski in plan view. Edge members which will form the edges of the ski are inserted in the slot. All the layers are pressed and bonded together with the edge members and heat is applied to cure the resin. In order to make skis of different sizes or shapes the slot cut into the base layer is simply changed accordingly through a computer which controls the cutting of the slot. This avoids the need of making a new mold as in conventional practice.

DRAWINGS

Other objects and advantages of the present invention will become apparent from the detailed description below taken in conjunction with the attached drawings in which:

FIG. 5 is a plan view of the sub-assembly of the ski of FIG. 3 but before the core layer 44 shown in FIG. 3 is laid; and FIG. 6 is a fragmental, cross-sectional view of edge members inserted in a base layer of the ski of FIG. 4.

DETAILED DESCRIPTION

Figure 1:
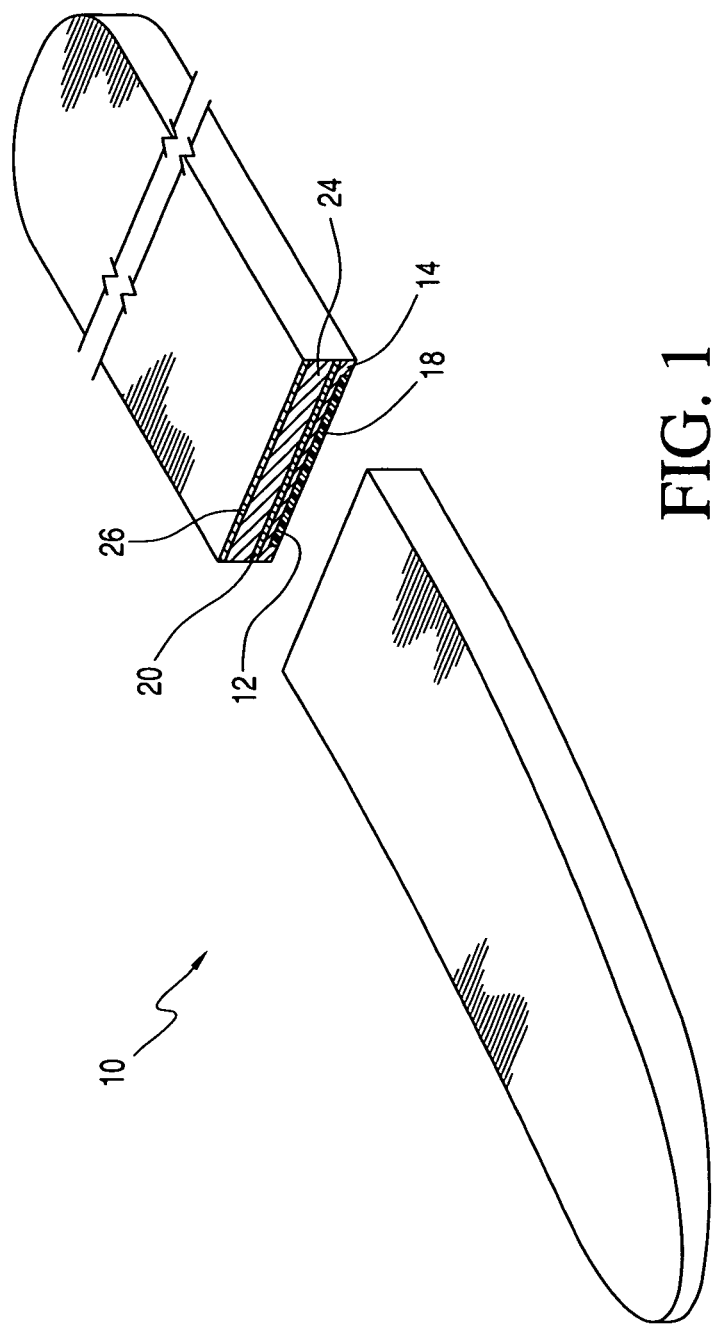
FIG. 1 is a perspective view of a ski constituting a preferred embodiment of the present invention with a mid-section broken away and shown in cross-section to show the layers of the ski.
Figure 2:
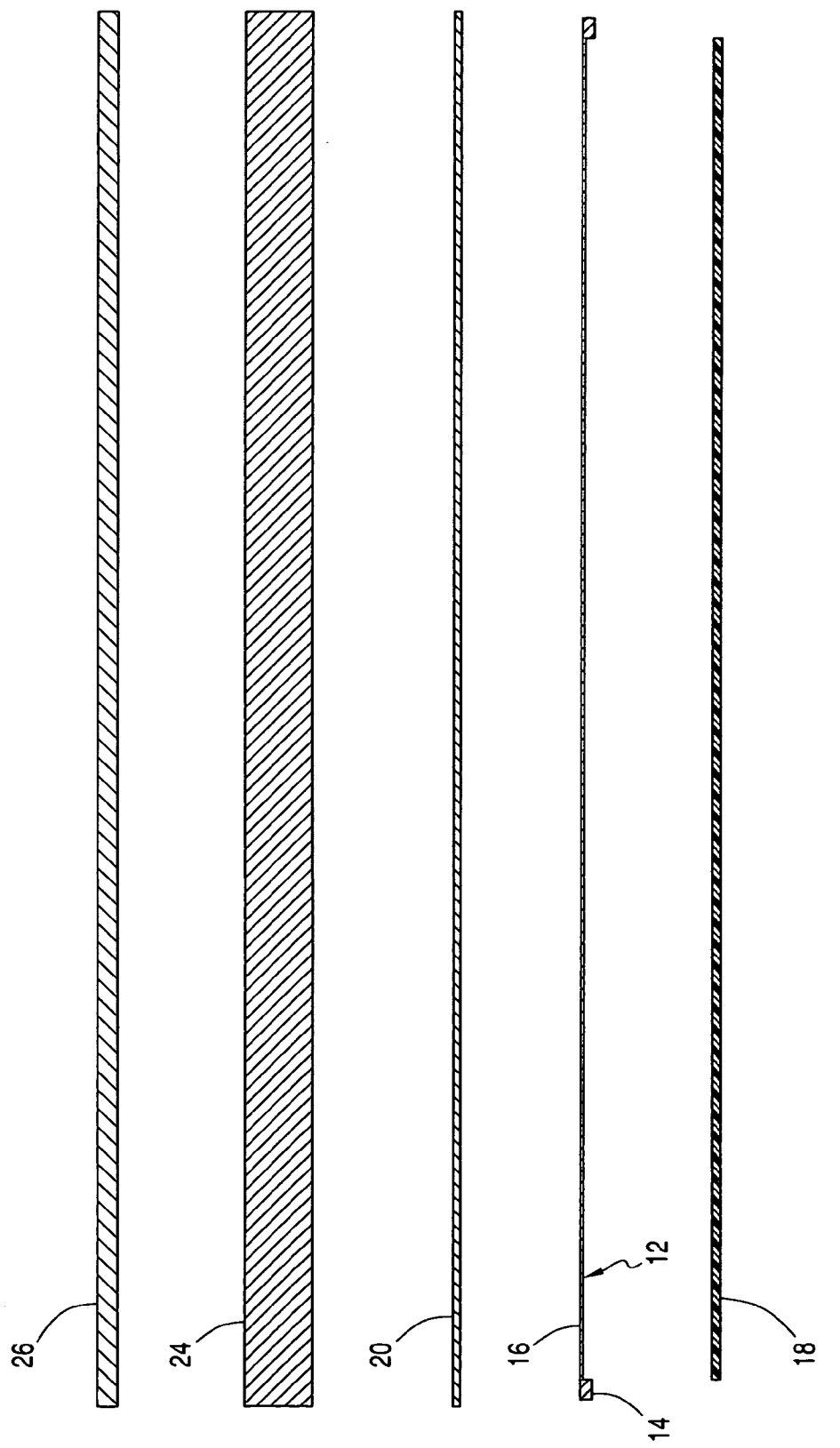
FIG. 2 is a transverse and exploded, cross-section of the ski of FIG. 1 showing the various layers of the ski.

Referring to the drawings in detail, there is shown for illustrative purposes a ski 10 constructed in accordance with one preferred version of the present invention. Referring to FIG. 1, the ski includes a first layer 12 made preferably of a sheet of structural carbon steel, for example, 1.8 mm thick. At the perimeter of layer 12 is an integral, continuous, flange 14 projecting downwardly from the main body 16 to define a cavity for receiving a base layer 18 formed preferably from a sheet of P-Tex 7500 which is a sintered polyethylene plastic, for example, 1.3 mm thick. The depth of the cavity in layer 16 is the same dimension, 1.3 mm, as the thickness of base layer 18 so that it fits snugly in the cavity as shown in FIG. 1 where it is glued to layer 12. The width of the flanges 14 in the shown embodiment is, for example, 3 mm. Flanges 14 form the edges of the ski 10 and eliminates the need of separate edge pieces to be attached to the ski as required by conventional ski designs and constructions. The above assembly may be performed on a generally flat support surface which will also support the ski layers while the core and upper layers are assembled as now will be described.

The core of the ski 10 is formed by two pre-cut core layers 20 and 24. For example, core 20 layer is approximately 1.0 mm thick and made of a wood like vertically laminated bamboo. Other woods like aspen, or for very high performance, pre-cured carbon Kevlar may also be used instead. Layer 20 is glued to the top surface of the steel layer 12 which is preferably rough-sanded to increase bonding. The core material provides the necessary flexibility or stretching needed at the bottom of the ski.

The main core 24 is pre-cut and also preferably made of vertically laminated bamboo having a thickness varying from about 2 mm at the tip and tail to about 12 mm at the center waist of the ski. Of course other woods like oak or maple may be used for layer 24 instead of bamboo. Layer 24 is laid on a film of epoxy on top of layer 20. The top of the ski is under compression when the bottom of the ski stretches so the top layer 26 is made from a very hard compression-resistant wood like oak, bamboo or maple, 2 to 3 mm thick depending on the performance required out of the ski. Top layer 26 is laid on a film of resin on the top of core 24.

The above assembly is pressed or drawn together with a predetermined camber as the epoxy is cured by heat. The camber or final shape of the ski can be obtained in any suitable manner. However preferably, the layers are drawn or pressed together by placing them in a vacuum bag where the vacuum in a bag draws or presses the layers together with the desired camber. Also the layers can be cured while being pressed together in a vacuum in an oven. The thermal qualities of the ski layers can be such as to shape the ski upon heating and curing the layers. Alternatively the camber shape can be provided by pressing the ski layers against a curved surface during the curing step. Any other method may be employed to provide a camber shape.

Figure 3:
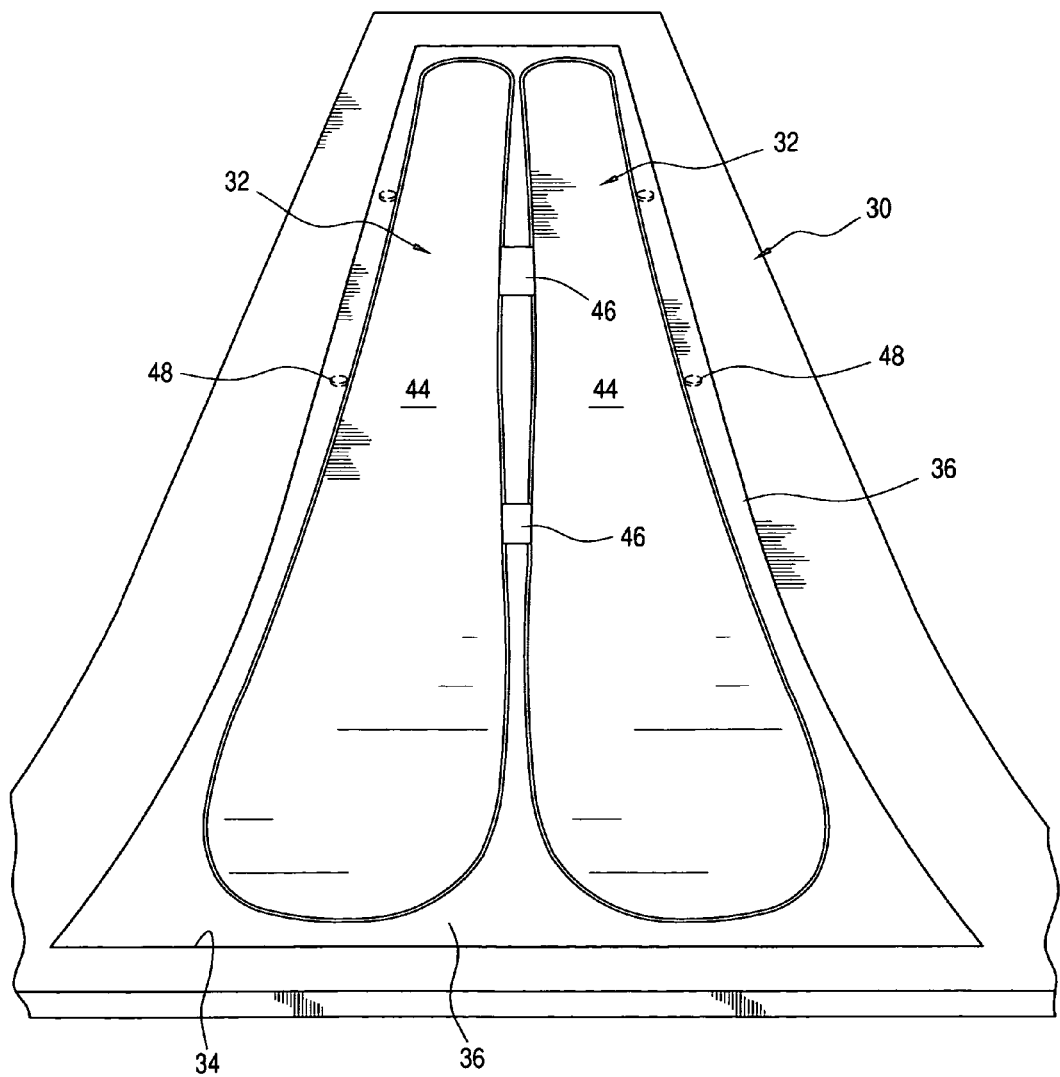
FIG. 3 is a perspective view of a sub-assembly of another ski during its construction on a support plate.
Figure 4:
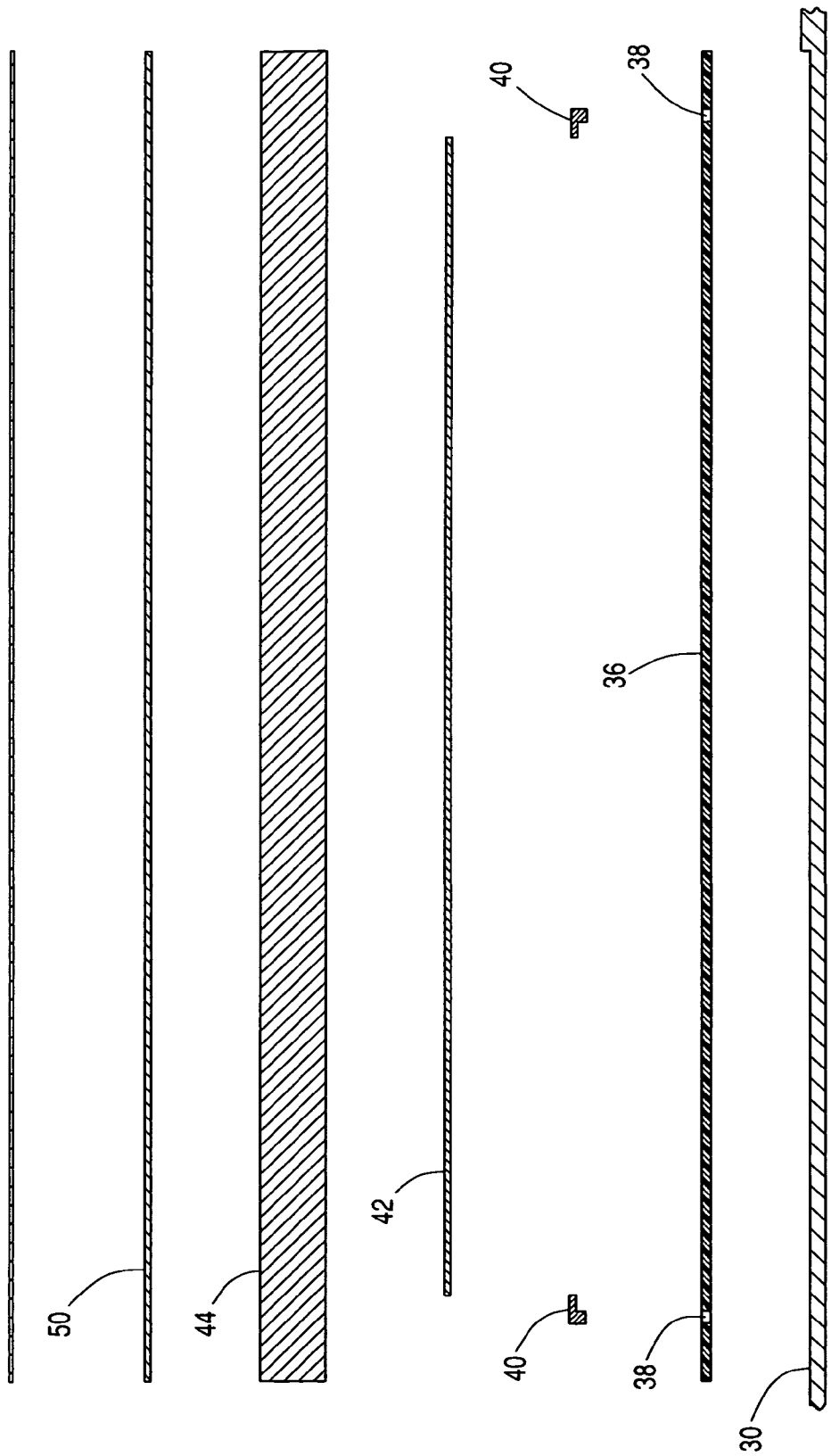
FIG. 4 is a transverse and exploded view of the ski being constructed in FIG. 3 showing all of its various layers.

Referring now to FIGS. 3, 4 and 5, there is shown another ski construction and method of making it using a generally planar support member 30, preferably made of a generally rectangular, aluminum plate for example, 10 mm thick, 2200 mm long and 500 mm wide. Two ski sub-assemblies 32 for two identical skis are shown on plate 30, however all of the layers of each ski are shown in FIG. 4 as will be described below. In the preferred embodiment, the top surface of plate 30 has a recess 1.3 mm deep formed in it as best shown in FIG. 3 at 34 for receiving a sheet of base material 36, sintered polyethylene plastic, preferably P-Tex 7500 from which the base layer 37 of the ski is cut with computer controlled cutting equipment. Recess 34 in the specific embodiment is rectangular and snugly receives the rectangular base material sheet 36 with their top surfaces flush with each other. This relationship secures base sheet material 36 against horizontal movement on plate 30. Base material sheet 36 in the specific embodiment is 2000 mm long, 328 mm wide and 1.3 mm thick. Referring to FIG. 5, base material sheet 36 is cut to provide a slot or other opening 38, for example, 2 mm wide along the entire perimeter of the base layer 37 of the ski as seen in plan view in FIG. 5.

Referring to FIG. 4, elongated steel edge members 40 are provided in slot 38 to provide the edges of the ski. In one embodiment the edges are 2 mm wide and 1.8 mm in depth, and have an inverted "L" shape cross-section to allow the top of the edge member 40 to engage the base layer 37 as shown in FIG. 6 to prevent the edge members from moving downwardly through slot 38. In addition, the edge members 40 may be further secured in place by using magnets 60 positioned under the edge members (as shown in FIG. 6) or the aluminum support 30. The edges of the ski can be formed by one continuous or a plurality of edge members 40. Since the shape of the base layer 37 is determined by the slot 38 cut into the base sheet 36, different ski shapes are easily made by varying the cut through the computer which controls the cutting machine.

One or more layers 42 in the shape of the ski in plan view and made of structural material such as 1 mm thick sheets of fiberglass and fiberglass and Kevlar mix is wet with epoxy resin and laid on the base layer 37.

A core layer 44 of the same shape as previous layer 42 and preferably made from a vertically laminated wood such as poplar, ash or bamboo or a combination of them depending on the performance requirements, is laid on a film of epoxy resin on the previous layer 42. As shown in FIG. 5, core layers 44 of both skis being assembled on the support plate 30 are laid together through their interconnection by tabs 46 which are eventually cut away from the skis after they are completed. Tabs 46 facilitate positioning and securement of the core layers 44. Further in this regard, it is preferred that upstanding abutments 48 or posts be provided to project upwardly from the support plate 30 and engage the core layer 44 and the other layers above the core layer 44 to be described below. Abutments 48 serve to secure the layers in position and may be provided in holes formed through the support plate 30 at the positions along the outside edges of both cores 44 as shown in FIG. 3. Abutments 48 are removable from their respective holes however magnets or any other suitable means may be used to keep them in place during assembly of the skis on the plate 30.

A layer or layers 50 of composite materials such as fiberglass and glass basalt mix are laid on a film of epoxy resin on the core layer 44. Layer 50 can also be a 0.5 mm thick sheet of high grade aluminum for certain skis requiring high speed use.

The top layer 52 is a 0.5 mm sheet of nylon, such as for example, Intersport 8210 which is laid on a film of epoxy resin on the previous composite layer 50. Any suitable graphics may be applied to top layer 52 before it is laid. The assembly is now complete and the next step is to draw or press the layers together preferably by using a vacuum bag or other vacuum chamber which receives the assembly. Additionally the assembly is heated in an oven to cure the resin. The oven may have a vacuum in the heat chamber to squeeze the layers together as the resin is cured.

The support plate 30 may have its forward portion curved upwardly to impart that shape to the ski after the ski layers are drawn or squeezed together while the resin is curing. Also if it is desired to have the rear end of the skis gradually curved upwardly, the support plate 30 can be formed with a recess (not shown) to receive an insert having the desired shape to impart to the end of the ski. Any other suitable method may be used to provide a desired shape or camber to the ski such as described above. After the ski layers are squeezed together and the resin is cured, only minor finishing operations remain like sanding, trimming the core 44, and beveling the edges 40 and varnishing.

In another embodiment and method of the present invention, the support plate 30 has a generally flat top surface without the recess 34 used in the embodiment of FIG. 3. However the support plate 30 is provided with abutments and/or clamps or any other suitable means for securing the ski layers in fixed horizontal position during their assembly.

It will be seen from the above that the methods and ski assemblies of the present invention for making skis avoid the need of a mold in the conventional sense. Indeed skis of different shapes and sizes may be made using the above ski assemblies and methods without requiring molds for each new ski shape or size. Moreover the present inventions do not require any mold for bonding the edge members to the base of the ski. It will also be seen that skis may be made in accordance with the present inventions to increase strength and durability of the ski while at the same time reducing labor and other costs of manufacture.

Although certain preferred embodiments and forms of the present invention have been shown and described above, it will be apparent to those skilled in the art that certain modifications and variations of the skis and construction methods of the present invention may be made but without departing from the scope of the present invention indicated in the appended claims.

What is claimed is:

1. An assembly for making a ski comprising in combination:
    a support member having a generally planar surface used as a tool separate from the ski for stacking layers of the ski on each other,
    a generally planar base sheet received on said support member including a first portion which is a base and bottommost layer of the ski,
    an elongated opening in the base sheet defining the perimeter of said base layer when viewed in plan,
    said base sheet having a second portion positioned outwardly of said base layer on the side of said elongated opening opposite said base layer and being generally in the same plane as the base layer,
    and an edge member received in said elongated opening for forming a bottom edge of said ski, said edge member being held in position in said opening by said base layer and said second portion of said base sheet,
    whereby a number of additional layers may be successively laid over the base layer and drawn and bonded together with said edge member to form a laminated body of the ski.

2. The assembly defined in claim 1 wherein said support member has means for holding said base sheet in a predetermined position on said surface.

3. The assembly defined in claim 2 wherein said means includes a recess in said surface, and said base sheet is received in said recess, said recess having walls adjacent to and engageable with said base sheet for holding said base sheet in position against lateral movement.

4. The assembly defined in claim 3 further including a plurality of abutments upstanding from said support member and engageable with said ski layers to prevent movement of said ski layers.

5. The assembly defined in claim 2 further including a plurality of abutments upstanding from said support member and engageable with ski layers to prevent movement of said ski layers.

6. The assembly defined in claim 1 wherein said base sheet is made of polyethylene plastic.

7. The assembly defined in claim 6 wherein said support member is an aluminum plate.

8. A method of making a ski comprising the steps of:
    providing a base sheet with an elongated opening defining on one side of the opening the perimeter of a base layer of the ski and on the opposite side of the opening a remaining portion of said base sheet,
    laying the base layer on a generally planar support surface together with said remaining portion surrounding said base layer in generally the same plane as the base layer,
    providing an edge member in said opening in the base sheet to provide the bottom edge of the ski, said edge member being held in position by said base layer and said remaining portion of the base sheet,
    providing successive layers of the ski on the base layer, and bonding the layers together.

9. The method defined in claim 8 including the step of holding the base layer on the support surface against movement.

10. The method defined in claim 9 including providing abutment members on said support surface to engage opposite sides of said base layers to secure them in position.

11. The method defined in claim 8 wherein said base sheet is placed in a recess in the support surface to prevent lateral movement of said base sheet.

12. The method defined in claim 11 including providing abutment members on said support surface to engage opposite sides of said base layers to secure them in position.

13. The method defined in claim 12 including the step after successive layers are provided on the base layer, of inserting the assembled layers of the ski and the support surface in a vacuum chamber to press said layers together.

14. The method defined in claim 8 including the step after successive layers are provided on the base layer, of inserting the assembled layers of the ski and the support surface in a vacuum chamber to press said layers together.

15. The method defined in claim 14 including the step of applying resin to the ski layers during stacking on the base layer, and placing the assembled layers of the ski in an oven to cure the resin while the ski layers are being pressed in said vacuum chamber which is located in said oven.

16. The method defined in claim 8 including the step of applying resin to the ski layers during assembly of the ski layers on the base layer and curing the resin while the ski layers are being pressed in the vacuum chamber.

17. An assembly for making a ski comprising in combination:
    a generally planar base sheet for forming a base layer of the ski and adapted to be received on a support during assembly of the ski, said base sheet including a first portion comprising a base layer of a ski and a second portion surrounding said base layer and generally lying in the same plane as said base layer,
    an elongated opening in the base sheet defining the perimeter of said base layer and corresponding to the shape of the ski when viewed in plan,
    an edge member received in said opening forming a bottom edge of said ski and being held in position by edges of said first and second portions of said base sheet defining said elongated opening,
    and a number of additional layers laid over the base layer and attached together with said base layer and said edge member to form a laminated body of the ski.

18. The assembly defined in claim 17 wherein said edge member has a portion engageable with a surface of the base layer to maintain said edge member in said opening during assembly of the ski.

19. The assembly defined in claim 17 wherein said additional layers include a core layer of wood material chosen from a class including poplar, ash and bamboo, and two layers of composite material including fiberglass on opposite sides of said core layer.

* * * * *